United States Patent
Utsugi

(10) Patent No.: US 8,941,760 B2
(45) Date of Patent: Jan. 27, 2015

(54) IMAGE PROCESSING APPARATUS, IMAGE PROCESSING METHOD AND ELECTRONIC CAMERA

(75) Inventor: Akihiko Utsugi, Machida (JP)

(73) Assignee: Nikon Corporation, Tokyo (JP)

( * ) Notice: Subject to any disclaimer, the term of this patent is extended or adjusted under 35 U.S.C. 154(b) by 627 days.

(21) Appl. No.: 13/238,562

(22) Filed: Sep. 21, 2011

(65) Prior Publication Data
US 2012/0069220 A1 Mar. 22, 2012

(30) Foreign Application Priority Data
Sep. 22, 2010 (JP) .................................. 2010-211709

(51) Int. Cl.
*H04N 5/217* (2011.01)
*H04N 9/68* (2006.01)
*H04N 9/64* (2006.01)
*H04N 5/18* (2006.01)

(52) U.S. Cl.
CPC ..................................... *H04N 5/185* (2013.01)
USPC ............................ 348/241; 348/234; 348/246

(58) Field of Classification Search
CPC ............................. H04N 5/2351; H04N 5/235
USPC ................................................... 348/234, 241
See application file for complete search history.

(56) References Cited

U.S. PATENT DOCUMENTS

| 5,235,434 A * | 8/1993 | Wober | 358/448 |
| 7,876,369 B2 * | 1/2011 | Aoki | 348/246 |
| 8,212,899 B2 * | 7/2012 | Egawa | 348/246 |

FOREIGN PATENT DOCUMENTS

| JP | 2000-224421 | 8/2000 |
| JP | 2007-295260 | 11/2007 |

* cited by examiner

*Primary Examiner* — Ahmed A Berhan
(74) *Attorney, Agent, or Firm* — Mori & Ward, LLP

(57) ABSTRACT

An image processing apparatus includes a clip part and an incremental processing part. The clip part sets a threshold value as an output luminance value of a process object pixel when a luminance value of the process object pixel of an image data having luminance values of a plurality of pixels is less than the threshold value set in advance. The incremental processing part finds and holds an incremental value of the output luminance value relative to the luminance value of the process object pixel, and finds the output luminance value of the process object pixel by subtracting the incremental value from the luminance value when the luminance value of the process object pixel is the threshold value or more.

17 Claims, 8 Drawing Sheets

| | x | 1 | 2 | 3 | 4 | 5 | 6 | 7 | 8 | 9 |
|---|---|---|---|---|---|---|---|---|---|---|
| y | 1 | R | G | R | G | R | G | R | G | R |
| | 2 | G | B | G | B | G | B | G | B | G |
| | 3 | R | G | R | G | R | G | R | G | R |
| | 4 | G | B | G | B | G | B | G | B | G |
| | 5 | R | G | R | G | R | G | R | G | R |
| | 6 | G | B | G | B | G | B | G | B | G |
| | 7 | R | G | R | G | R | G | R | G | R |
| | 8 | G | B | G | B | G | B | G | B | G |
| | 9 | R | G | R | G | R | G | R | G | R |
| | 10 | G | B | G | B | G | B | G | B | G |

Fig. 8A

Fig. 8B reference pixel group process object pixel p(5,5)

IMAGE PROCESSING APPARATUS, IMAGE PROCESSING METHOD AND ELECTRONIC CAMERA

CROSS REFERENCE TO RELATED APPLICATION

This application is based upon and claims the benefit of priority from Japanese Patent Application No. 2010-211709, filed on Sep. 22, 2010, the entire contents of which are incorporated herein by reference.

BACKGROUND OF THE INVENTION

1. Field of the Invention

The present application relates to an image processing apparatus, an image processing method and an electronic camera.

2. Discussion of the Background

In recent years, electronic cameras using a CCD type image sensor, a CMOS type image sensor, and so on are widely used. In the electronic camera using these image sensors, a process removing noises at a high-speed photographing time is performed (for example, refer to Japanese Unexamined Patent Application Publication No. 2000-224421 and Japanese Unexamined Patent Application Publication No. 2007-295260).

SUMMARY OF THE INVENTION

According to an aspect of the present embodiment, an image processing apparatus includes a clip part and an incremental processing part. The clip part sets a threshold value as an output luminance value of a process object pixel when a luminance value of the process object pixel of an image data having luminance values of a plurality of pixels is less than the threshold value set in advance. The incremental processing part finds and holds an incremental value of the output luminance value relative to the luminance value of the process object pixel, and subtracts the incremental value from the luminance value to find the output luminance value of the process object pixel when the luminance value of the process object pixel is the threshold value or more.

According to another aspect of the present embodiment, an electronic camera includes the image processing apparatus, an image shooting part, an operation member, and a recording part. The image shooting part outputs an image data to the image processing apparatus, the image data having luminance values in which object light incident via an optical system is photoelectric converted by a plurality of pixels disposed two-dimensionally. The operation member gives an imaging timing to the image shooting part. The recording part records the image data output by the image processing apparatus to a storage medium.

According to still another aspect of the present embodiment, an image processing method executable on a computer includes setting a threshold value as an output luminance value of a process object pixel when a luminance value of the process object pixel of an image data having luminance values of a plurality of pixels is less than the threshold value set in advance. An incremental value of the output luminance value relative to the luminance value of the process object pixel is found. The incremental value found at an incremental calculation processing is held as a variable. The output luminance value of the process object pixel is found by subtracting the incremental value held as the variable from the luminance value when the luminance value of the process object pixel is the threshold value or more.

BRIEF DESCRIPTION OF THE DRAWINGS

A more complete appreciation of the embodiment and many of the attendant advantages thereof will be readily obtained as the same becomes better understood by reference to the following detailed description when considered in connection with the accompanying drawing.

FIG. 8A is an explanatory view illustrating an application example to a Raw data.

FIG. 8B is an explanatory view illustrating the application example to the Raw data.

DESCRIPTION OF THE EMBODIMENTS

Figure 1:
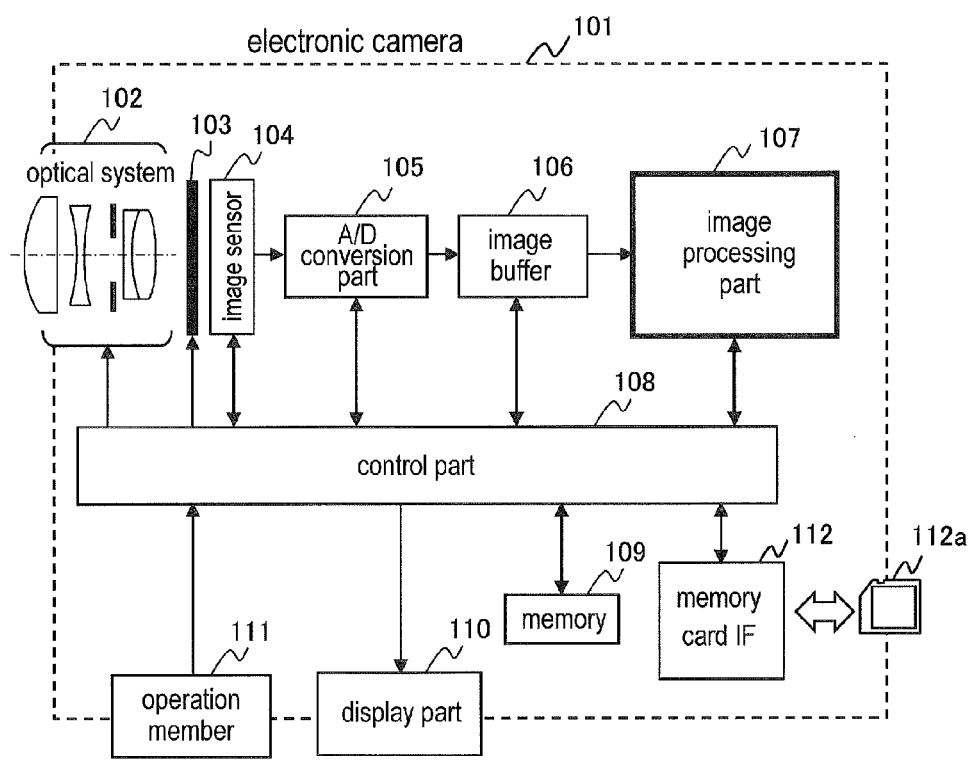
FIG. 1 is a block diagram illustrating a configuration example of an electronic camera 101 according to the present embodiment.

The embodiments will now be described with reference to the accompanying drawings, in which like reference numerals designate corresponding or identical elements throughout the various drawings.

Hereinafter, an image processing apparatus, an image processing program, and an electronic camera according to the embodiments are described in detail by using the drawings. Note that an example of an electronic camera to which an image processing apparatus is mounted is described in the present embodiment, but it may be a program of a personal computer inputting an image data which is already photographed and performing image processing such as a noise reduction, or a stand-alone image processing apparatus.

[Configuration Example and Basic Operations of Electronic Camera 101]

At first, a configuration example and basic operations of an electronic camera 101 which are common to each embodiment are described. FIG. 1 is a block diagram illustrating a configuration example of the electronic camera 101, and the electronic camera 101 is made up of an optical system 102, a mechanical shutter 103, an image sensor 104, an A/D conversion part 105, an image buffer 106, an image processing part 107, a control part 108, a memory 109, a display part 110, an operation member 111, and a memory card IF (interface) 112.

In FIG. 1, object light incident on the optical system 102 is incident on a light-receiving surface of the image sensor 104 via the mechanical shutter 103. Here, the optical system 102 is made up of plural pieces of lenses such as a zoom lens, a focus lens, a lens driving part, an aperture, and so on, and the zoom lens, the focus lens, the aperture or the like are controlled in accordance with instructions from the control part 108.

The image sensor 104 is made up of, for example, a CMOS type solid state image sensor, and plural pixels each having a photoelectric conversion part at the light receiving surface thereof are two-dimensionally disposed.

The A/D conversion part 105 converts an image signal output from the image sensor 104 into a digital value by each pixel, and temporary stores at the image buffer 106 as an image data for a piece of photographing image. For example, when a resolution of the image sensor 104 is 1000 pixels× 1000 pixels, the image data for a million pixels are taken into the image buffer 106.

The image buffer 106 is made up of, for example, a volatile high-speed memory, and it is used as a buffer memory when the image processing part 107 performs image processing in addition that the image data output from the A/D conversion part 105 is temporary stored thereto. The image buffer 106 is also used as a buffer when a photographed image and already photographed images stored at a memory card 112a coupled to the memory card IF 112 are read to be displayed on the display part 110, and when the image processing is performed.

The image processing part 107 performs white balance processing, color interpolation processing, gamma correction processing, saturation enhancement processing, edge enhancement processing, or compression processing of the image data by an image compression method based on the JPEG standard and so on for the image data taken into the image buffer 106. In particular, the image processing part 107 performs dark processing, noise reduction processing, negative clip processing, and so on described later, in the present embodiment.

The control part 108 is made up of a CPU operating in accordance with, for example, programs stored inside thereof, and controls whole operations of the electronic camera 101. For example, the control part 108 sets a photographing mode of the electronic camera 101 in accordance with operations of a photographing mode selection dial and a release button of the operation member 111. The control part 108 performs a lens control and an aperture control of the optical system 102 when the release button is pressed to open/close the mechanical shutter 103, and captures an object image by the image sensor 104. The control part 108 reads the image signal from each pixel with the resolution set in advance from the image sensor 104, converts the image signal into a digital value by the A/D conversion part 105, and takes the image data for one screen into the image buffer 106. Further, the control part 108 instructs the image processing part 107 to perform predetermined image processing for the image data taken into the image buffer 106, stores the image data after the image processing (for example, a JPEG data) to the memory card 112a via the memory card IF 112 while adding a predetermined file name and header information, and displays the photographed image on the display part 110.

The memory 109 is made up of, for example, a nonvolatile semiconductor memory such as a flash memory, and parameters of the photographing mode, exposure information, focus information, and so on of the electronic camera 101 are stored thereto. The control part 108 controls the operations of the electronic camera 101 by referring to these parameters. Note that these parameters are updated accordingly in accordance with user operations performed via the operation member 111.

The display part 110 is made up of a liquid crystal display and so on, and the photographed image and a setting menu screen necessary for the operations of the electronic camera 101 and so on are displayed by the control part 108.

The operation member 111 is made up of a power button, the release button, the photographing mode selection dial, a cursor button, and so on. A user uses the electronic camera 101 by operating these operation buttons. For example, a high-speed photographing mode, an ISO speed, and so on are selected by the photographing mode selection dial. Note that operation information of these operation buttons are output to the control part 108, and the control part 108 controls the whole operations of the electronic camera 101 in accordance with the operation information input from the operation member 111.

The memory card IF 112 is an interface to couple the memory card 112a to the electronic camera 101. The control part 108 reads/writes the image data from/to the memory card 112a via the memory card IF 112.

The configuration and basic operations of the electronic camera 101 are as described above. Note that when not the electronic camera 101 but a stand-alone image processing apparatus according to the embodiment is configured, the apparatus is made to be the one removing a block for imaging made up of the optical system 102, the mechanical shutter 103, the image sensor 104, and the A/D conversion part 105, and the control part 108 (corresponding to the control part of the image processing apparatus) performs the operations in which the already photographed image data are read from the memory card 112a to the image buffer 106, the dark processing, the noise reduction processing, the negative clip processing, and so on are performed at the image processing part 107, and stores again to the memory card 112a.

[Negative Luminance Value]

Figure 2:
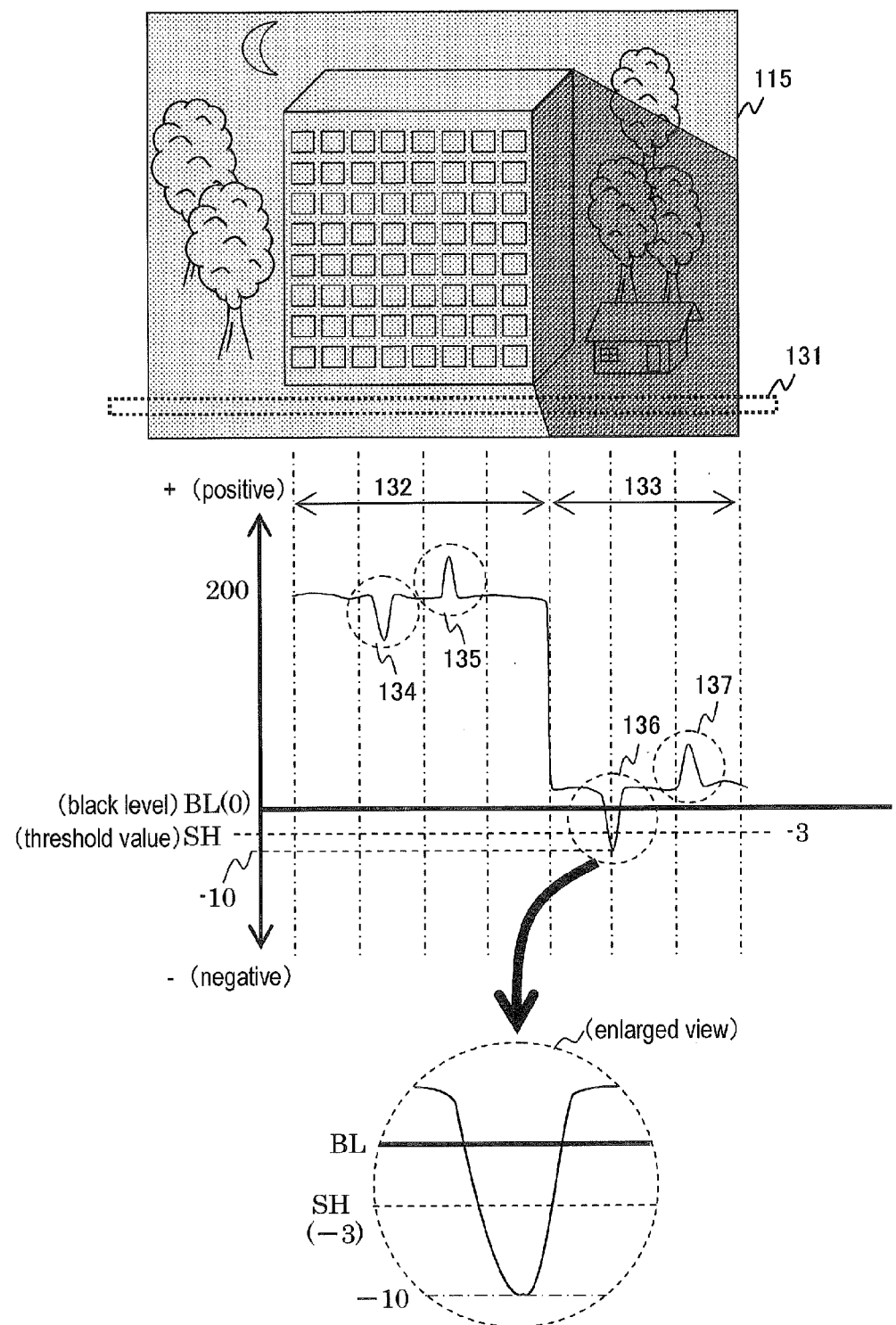
FIG. 2 is an explanatory view to explain a negative luminance value.

Here, a negative luminance value is described by using FIG. 2. FIG. 2 is a graph representing a change of the luminance value at a part of a row 131 of a sample image 115 containing a dark part. Note that a vertical axis of the graph represents the luminance value in which a black level (BL) is set to be "0" (zero), and a horizontal axis corresponds to a position in a horizontal direction of the row 131. In the graph in FIG. 2, an area 132 corresponds to a bright part of the row 131 of the sample image 115, and a luminance value thereof is approximately 200. Besides, an area 133 corresponds to a dark part of the row 131 of the sample image 115, and the luminance value thereof is approximately 10. In general, the luminance value of the black level (BL) is set to be "0" (zero) while using an output of a pixel existing at a light-shielding area of the image sensor 104 as a reference, but there is a case when the luminance value swings over to a negative side relative to "0" (zero) affected by noises, and this is called as a negative luminance value.

In the graph in FIG. 2, when there are noises, the luminance value of the image is affected by the noises, and therefore, the luminance value of the image varies to positive and negative such as, for example, noise parts 134, 135, 136, and 137. Note that the noise parts 134, 135, 136, and 137 are drawn with exaggeration for easy to understanding in FIG. 2. In actual, a level of the noise is small, and therefore, it is no problem at the bright part 132 of which luminance value is approximately 200, but there is a case when the luminance value becomes a black level or less (negative luminance value) at the dark part 133 of which luminance value is approximately 10, for example, such as the noise part 136. In this case, for example, the luminance value becomes a value such as (−10), and it is conventionally clipped to be a black level being out of a range of the luminance value. On the other hand, it means that the luminance value becomes large for an extent that the negative luminance value is clipped if it is considered that an average value of the noise becomes theoretically "0" (zero). In particular, when noise reduction processing such as averaging is performed by using plural pixels at the dark area in a subsequent process, the average luminance value at the dark part (the dark part 133 of the image and so on) where many pixels having negative luminance values are contained becomes large, and a problem occurs that it is looked brighter than an actual image.

In the present embodiment, a threshold value (SH) is set in advance ((SH =−3) in the example in FIG. 2), and a process is performed in which a clip part 136 which is clipped to the threshold value when the luminance value of a process object pixel is less than the threshold value, is held as an increment and the held increment is subtracted from a luminance value of a pixel of which luminance value is the threshold value or more at a periphery of a pixel of which luminance value is less than the threshold value. The luminance value at the part 133 of which image is dark where many pixels with the negative luminance values are contained is thereby controlled not to be large. These processes are performed by the image processing part 107 in FIG. 1, but concrete processes of the image processing part 107 are described later in detail.

Figure 3:
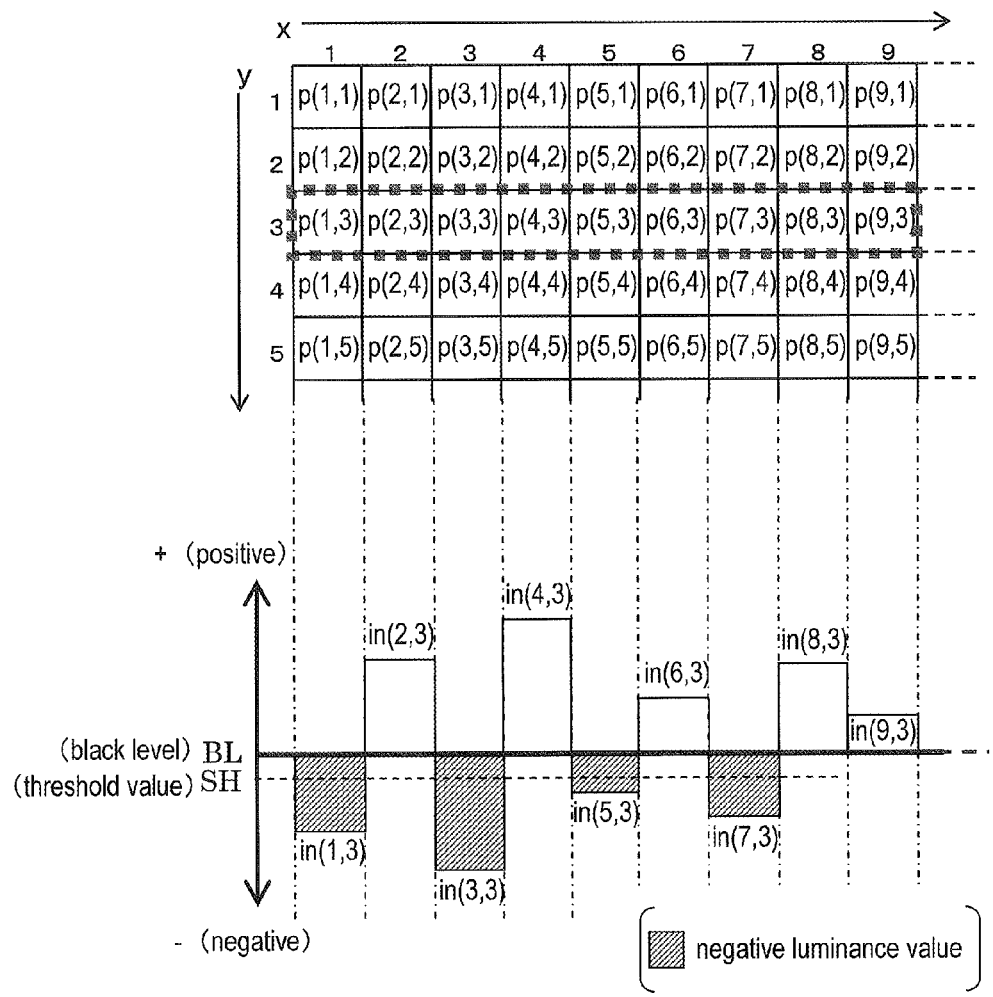
FIG. 3 is an explanatory view illustrating an example of a luminance value of an image sensor 104.

Besides, the luminance value is represented by an analog waveform in the graph in FIG. 2 for easy to understanding, but in actual, the image data A/D converted at the A/D conversion part 105 and taken into the image buffer 106 has luminance values quantized by each pixel as illustrated in FIG. 3. Note that in the A/D conversion part 105, the negative luminance values of the black level or less are also quantized and taken into the image buffer 106. This is enabled by, for example, adjusting a reference voltage when the image signal output from the image sensor 104 is A/D converted, so that the black level does not become a minimum value of a quantization range of the A/D conversion part 105.

FIG. 3 is a view illustrating an example of a part of pixels and luminance values of the image sensor 104 having pixels two-dimensionally disposed in x column and y row. In the graph in FIG. 3, an example of the luminance values at the third row is represented, and for example, respective input luminance values in (1, 3), in (3, 3), in (5, 3), and in (7, 3) of pixels p (1, 3), p (3, 3), p (5, 3), and p (7, 3) have negative luminance values. Here, an image value (input luminance value) of a pixel p (x, y) in a pixel coordinate illustrated in FIG. 3 is described as "in (x, y)".

[Configuration and Operations of Image Processing Part 107]

Figure 4:
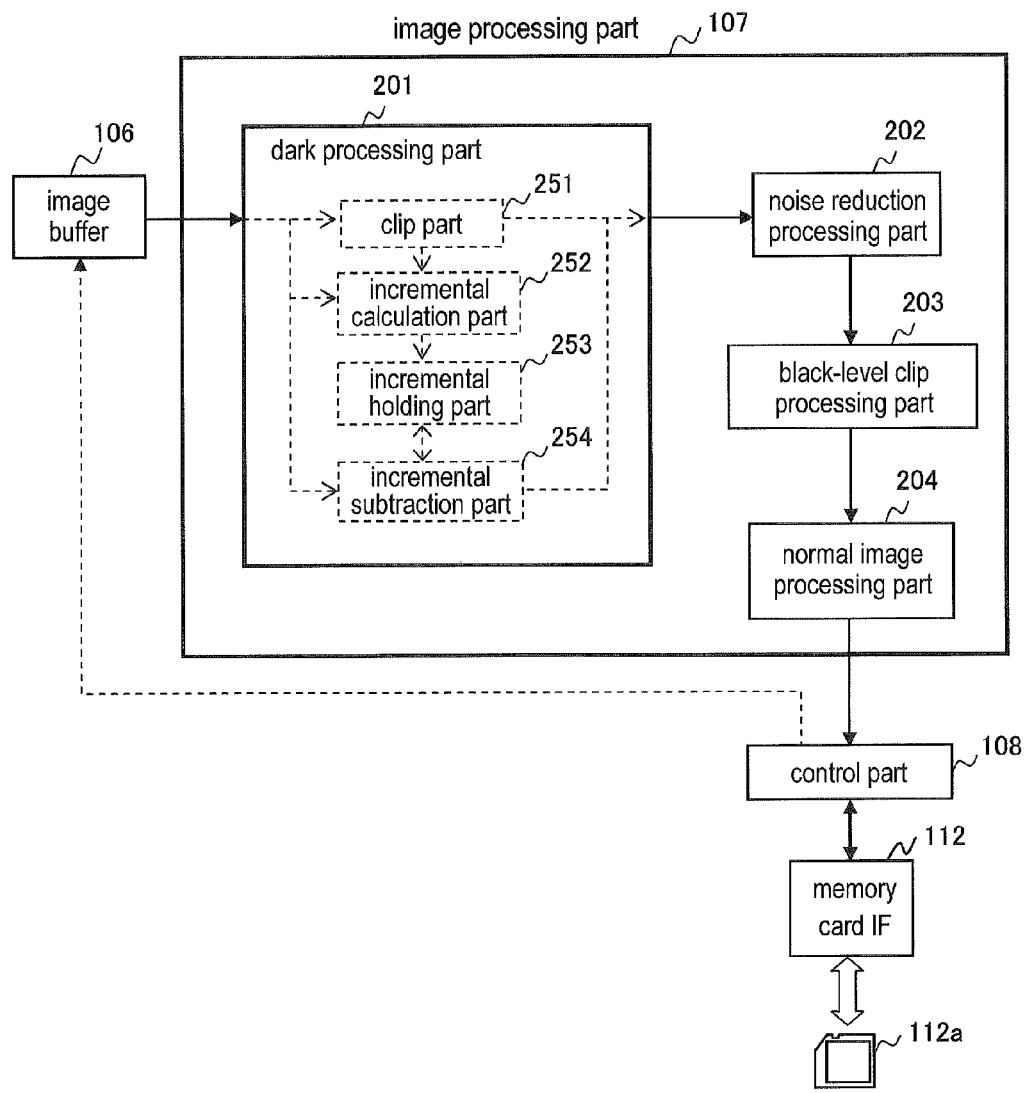
FIG. 4 is a block diagram illustrating a configuration example of an image processing part 107.

Next, a configuration and operations of the image processing part 107 are described by using a block diagram in FIG. 4. In FIG. 4, the image processing part 107 is made up of a dark processing part 201, a noise reduction processing part 202, and a black-level clip processing part 203. Further, the image processing part 107 includes a normal image processing part 204 performing white balance processing, color interpolation processing, gamma correction processing, saturation enhancement processing, edge enhancement processing, or compression processing of the image data by the image compression method based on the JPEG standard and so on for an image data after the process of the black-level clip processing part 203. The image data after the image processing is stored at the memory card 112a via the control part 108 and the memory card IF 112.

Here, when not the electronic camera 101 but the stand-alone image processing apparatus is enabled, the already photographed image data stored at the memory card 112a is read to the image buffer 106, and the image processing of the dark processing part 201, the noise reduction processing part 202, the black-level clip processing part 203, and so on are performed, and the image data after the processing is written to the image buffer 106 again. Note that in FIG. 4, the same reference symbols designate the same components in FIG. 1. Hereinafter, each part of the image processing part 107 is described in turn.

The dark processing part 201 performs the process setting a threshold value which is smaller than the black level and subtracting the increment when the luminance value is clipped to the threshold value from the luminance values of the peripheral pixels to avoid the problem in which the luminance value increases for the extent of a negative component clipped in the pixel at the dark part having the negative luminance value which is less than the black level. It is thereby possible to perform the noise reduction processing for the image in which the average value of the luminance values is appropriately kept without incurring a local increase of the luminance value at the dark part, and both a superior noise reduction and an appropriate reproduction of the luminance value at the dark part can be enabled. Note that the detail of the dark processing part 201 is described later.

The noise reduction processing part 202 performs the noise reduction processing by using a publicly known noise reduction method such as, for example, averaging with the luminance values of the peripheral pixels.

The black-level clip processing part 203 clips the luminance value to, for example, a value of the luminance of "0" (zero) or more. This is a general process performed to use the image data by clipping to the luminance value of the black level (luminance value="0" (zero)) or more. Note that the black-level clip processing part 203 performs clip processing based on the black level which is different from the clip processing based on the threshold value performed at the dark processing part 201. Here, the threshold value of the dark processing part 201 may be set to be the black level, but it is experientially known that the average value of the dark part after the dark processing tends to lean to the negative side. Therefore, it is preferable that the increment when the luminance value is clipped by the threshold value smaller than the black level is found. For example, the threshold value is set as an (expression 1).

Threshold value $SH$=(negative coefficient)×(standard deviation of dark part noise)     (expression 1)

Note that in the (expression 1), the negative coefficient is a value at approximately (−0.1 to −1), the standard deviation of the dark part noise is a standard deviation of output values of pixels at the light-shielding area of the image data (pixels at an OB area). These values are measured at a manufacturing time, and stored at the memory 109 and so on of the electronic camera 101. The image processing part 107 performs the processes by reading these parameters stored at the memory 109.

[Processes of Dark Processing Part 201]

Hereinafter, processes of the dark processing part 201 are described in detail. Note that the dark processing part 201 includes a clip part 251, an incremental calculation part 252, an incremental holding part 253, and an incremental subtraction part 254.

The clip part 251 clips the input luminance value in (x, y) of the process object pixel p (x, y) to a threshold value when the input luminance value in (x, y) of the process object pixel p (x, y) is less than the threshold value set in advance. The clip part 251 outputs a luminance value after the clip as an output luminance value out (x, y) of the process object pixel p (x, y). For example, when the input luminance value in (x, y) is (−10) and the threshold value is (−3), the luminance value is clipped to (−3), and (−3) becomes the output luminance value.

The incremental calculation part 252 sets a difference between the luminance value before it is clipped by the clip part 251 and the luminance value after it is clipped as an incremental value. Note that when the input luminance value in (x, y) of the pixel of which incremental value is to be found is the threshold value set in advance or more, the incremental value is "0" (zero). Besides, in the present embodiment, it is described as for a case when the incremental calculation part 252 calculates a smoothed incremental value in which incremental values of plural pixels peripheral to the process object pixel p (x, y) are smoothed, but the process may be performed by using only the incremental value of the process object pixel p (x, y). The detailed processes of the incremental calculation part 252 are described later.

The incremental holding part 253 holds the incremental value found by the incremental calculation part 252. Note that the smoothed incremental value found by the incremental calculation part 252 (smoothed incremental value) is held in the present embodiment. There is a case when the incremental value held by the incremental holding part 253 means the smoothed incremental value in the following description.

The incremental subtraction part 254 subtracts the incremental value held at the incremental holding part 252 from the luminance value when the input luminance value in (x, y) of the process object pixel p (x, y) is the threshold value or more. The luminance value after the subtraction is output as the output luminance value out (x, y) of the process object pixel p (x, y).

Note that the subtraction is performed so that the luminance value after the subtraction does not become less than the threshold value, and the subtracted incremental value is deducted from the incremental value held at the incremental holding part 252. The remaining incremental value is held, and the incremental value found at a next process object pixel is added and stacked. The detailed processes of the incremental subtraction part 254 are described later.

Figure 5:
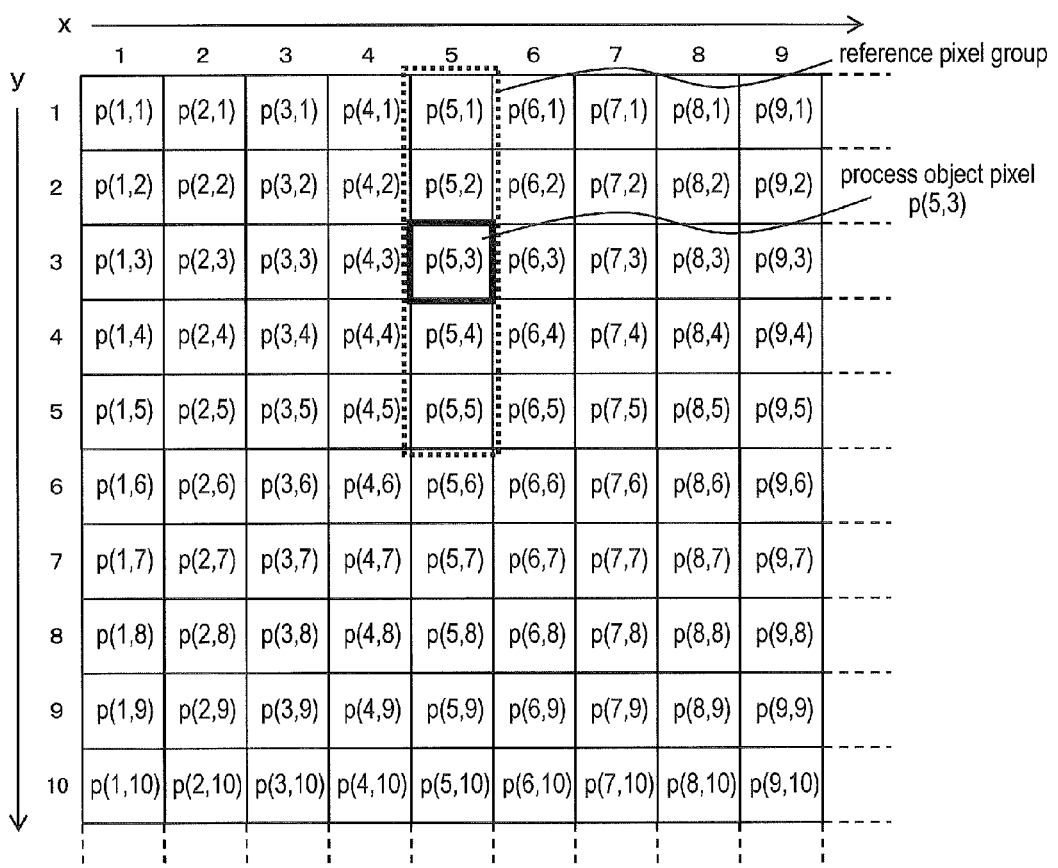
FIG. 5 is an explanatory view illustrating a pixel disposition example of the image sensor 104.

Next, a concrete process example of the dark processing part 201 is described by using FIG. 5. In FIG. 5, pixels at 10 columns and 9 rows being a part of the image sensor 104 having pixels two dimensionally disposed in x column and y row are illustrated. Here, the processes of the dark processing part 201 are described while setting the process object pixel p (x, y) as a pixel p (5, 3) at 3 rows 5 columns, and citing an input luminance value in (5, 3) of the pixel p (5, 3) as an example. Besides, actual dark processing is performed in a row unit from a first row in sequence as it is described in FIG. 2. In each row, pixels are processed in sequence in a column unit from a pixel at a first column.

(Processes of Incremental Calculation Part 252)

In FIG. 5, a pixel group of which smoothed value of the increments is to be found centering on the process object pixel is called as a reference pixel group. In an example in FIG. 5, five pixel groups made up of each two pixels at above and below in a column direction centering on the process object pixel p (5, 3) of from a pixel p (5, 1) to a pixel p (5, 5) are the reference pixel group. Note that the reference pixel group is set to be an area of two pixels at above and below in the column direction centering on the process object pixel p (5, 3) in the present embodiment, but plural pixels groups in a vicinity of the process object pixel may be set as the reference pixel group without being limited to the above. For example, peripheral nine pixel groups made up of pixels p (4, 2), p (5, 2), p (6, 2), p (4, 3), p (6, 3), p (4, 4), p (4, 5), p (4, 6) centering on the process object pixel p (5, 3) may be set as the reference pixel group in FIG. 5. Otherwise, only the incremental value of the process object pixel p (5, 3) may be found without considering the reference pixel group.

Note that the input image is described as a monochrome image without considering color components of the input image for easy to understanding, but when the input image has plural color components such as RGB, the similar processes may be performed as for each color component.

Next, a way how to find the increment in each pixel of the reference pixel group is described. At first, a difference value between the input luminance value in (x, y) of the pixel p (x, y) and the threshold value (SH) is found (expression 2). Note that here, the value (SH) described in advance at the (expression 1) is set beforehand as the threshold value.

$$\text{Difference value } d = SH - \text{in}(x, y) \quad \text{(expression 2)}$$

Figure 6A:
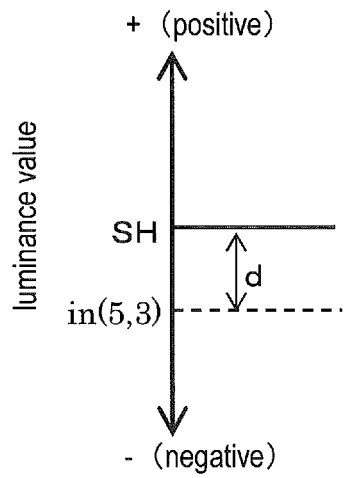
FIG. 6A is an explanatory view illustrating a decision example of the luminance value.
Figure 6B:
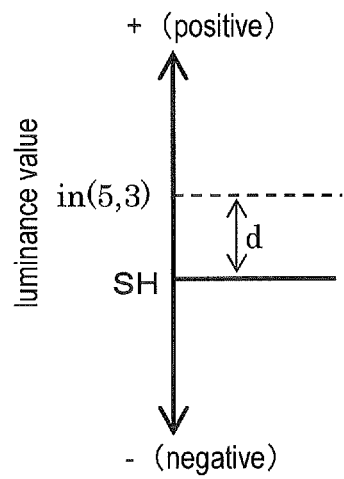
FIG. 6B is an explanatory view illustrating the decision example of the luminance value.

When the input luminance value in (x, y) of the process object pixel p (x, y) is less than the threshold value, the difference value "d" becomes positive (d"0" (zero)), and the difference value "d" corresponds to the increment. On the other hand, when the input luminance value in (x, y) of the process object pixel p (x, y) is the threshold value or more, the difference value "d" becomes negative (d<"0" (zero)), and the difference value "d" does not become the increment, and therefore, the increment value of the process object pixel p (x, y) is "0" (zero). For example, the difference value "d" between the input luminance value in (5, 3) of the pixel p (5, 3) and the threshold value (SH) becomes (d"0" (zero)) from the (expression 2) as illustrated in FIG. 6A. On the other hand, the difference value "d" becomes (d<"0" (zero)) as illustrated in FIG. 6B.

As stated above, the incremental values of the respective pixels of the reference pixel group centering on the process object pixel are found.

Next, a method smoothing the incremental values of the reference pixel group centering on the process object pixel is described. At first, the difference values "d" of the (expression 2) are calculated as for the respective pixels of the reference pixel group. The processes are performed in which the difference values "d" when "d>'0' (zero)" are added as the increment, and the increment of the pixel is set as "0" (zero) when "d'0' (zero)". This process is described as a function max ((SH−in (x, y)), "0" (zero)). This function is a function setting a maximum value between the difference value "d ((SH−in (x, y))" and "0" (zero) as an output value, and for example, the difference value "d" becomes the output value when "d>'0' (zero)", and "0" (zero) becomes the output value when "d'0' (zero)". As stated above, only the increments of the respective pixels are extracted. The extracted increments of the respective pixels are smoothed within the reference pixel group, and a smoothed value of the increments (smoothed incremental value) at the reference pixel group is found. At this time, the smoothed incremental value may be found by simply averaging the incremental values of the reference pixel group, but in the present embodiment, the smoothed incremental value is found by weighting the incremental values of the respective pixels of the reference pixel group with a weighting coefficient set in advance.

For example, when a smoothed incremental value "s" of the increments of the reference pixel group of five pixels from the pixel p (5, 1) to the pixel p (5, 5) made up of each two pixels at above and below in the column direction centering on the process object pixel p (5, 3) illustrated in FIG. 5 is found, the calculation is performed as an (expression 3) by using the function max described beforehand.

Smoothed incremental value "s" = (expression 3)

{max((SH − in(5, 1)), 0) + 2 × max((SH − in(5, 2)), 0) +

-continued $$2 \times \max((SH - in(5, 3)), 0) +$$
$$2 \times \max((SH - in(5, 4)), 0) +$$
$$\max((SH - in(5, 5)), 0)\}/8$$

In the (expression 3), the smoothed incremental value "s" is found by weighting the three pixels of the pixels p (5, 2), p (5, 3), p (5, 4) with a coefficient of two times, and weighting the two pixels of the pixels p (5, 1), p (5, 5) with a coefficient of one time, and thereafter, it is made to be ⅛. Note that the above-stated coefficients are examples, and the smoothed incremental value "s" may be calculated by, for example, coefficients in an (expression 4).

Smoothed incremental value "s" = (expression 4)

$$\{0.1 \times \max((SH - in(5, 1)), 0) +$$
$$0.2 \times \max((SH - in(5, 2)), 0) +$$
$$0.4 \times \max((SH - in(5, 3)), 0) +$$
$$0.2 \times \max((SH - in(5, 4)), 0) +$$
$$0.1 \times \max((SH - in(5, 5)), 0)\}$$

Besides, the weighting is performed such that a sum of the coefficient values of the respective pixels becomes one as illustrated in the (expression 4), and thereby, it is possible to similarly find the smoothed incremental value "s" even when the number of pixels of the reference pixel group is increased/decreased.

The found smoothed incremental value "s" of the increments of the reference pixel group is added to a stack variable "stack" stacked up to that time to perform the stack of the incremental values (expression 5).

Stack=stack+s (expression 5)

As stated above, the incremental calculation part 252 finds the smoothed incremental value "s" by smoothing the increments of the reference pixel group centering on the process object pixel p (x, y), and performs the stack of the increments by adding to the stack variable "stack". Here, the stack variable "stack" corresponds to the incremental holding part 253.

(Incremental Subtraction Part 254)

The incremental subtraction part 254 subtracts the incremental value held at the incremental holding part 252 from the luminance value when the input luminance value in (x, y) of the process object pixel p (x, y) is the threshold value or more.

When the input luminance value in (x, y) is less than the threshold value, the increment is just stacked to the stack variable "stack" at the incremental holding part 253, and therefore, the incremental subtraction part 254 does not perform the process. When the input luminance value in (x, y) is the threshold value or more, the incremental subtraction part 254 sets a smaller value which is gotten by comparing the value of the stack variable "stack" holding the incremental value stacked up to that time and the difference value (in (x, y)–SH) between the input luminance value in (x, y) and the SH as an offset value (offset), and subtracts the offset value from the input luminance value (x, y). The luminance value after the subtraction is output as the output luminance value out (x, y) of the process object pixel p (x, y).

Here, the process setting the smaller value which is gotten by comparing the value of the stack variable "stack" and the difference value (in (x, y)–SH) as the offset value (offset) is described as a function min (stack, (in (x, y)–SH)).

Besides, the value of the stack variable "stack" is decreased for an extent of the offset value (offset) (expression 6).

Stack=stack–offset (expression 6)

Here, the offset value (offset) corresponds to an amount subtracted from the luminance value of the process object pixel having the luminance value of the threshold value or more. The value of the stack variable "stack" is decreased for the amount subtracted from the luminance value. When the value of the stack variable "stack" remains, it is carried over to a process of a next process object pixel (a pixel p (6, 3) at a next column in the example in FIG. 5).

After that, the similar processes are repeated while setting the pixel p (6, 3) at the next column as the process object pixel. After the processes are finished up to the last column of the row, the value of the stack variable "stack" is reset to "0" (zero), and the processes of the next row are repeated similarly.

Note that in the above-stated example, the value of the stack variable "stack" is kept holding during the process of the same row, but for example, when the stacked incremental value is large, it does not decrease easily, and therefore, it is conceivable that the pixel of which luminance value is the threshold value or more is affected. Accordingly, the value of the stack variable "stack" may be reset to "0" (zero) when, for example, the pixels of which luminance values are the threshold value or more continue for a predetermined number (for example, five pixels) to avoid the problem as stated above. It is thereby possible that the luminance values of pixels existing at positions getting away from the dark area of the image are not affected, and it is possible to appropriately process only in a vicinity of the dark area of the image.

As stated above, the dark processing part 201 stacks the increment when the pixel of which luminance value is less than the threshold value is clipped to the threshold value, the stacked increment (or a part of the increment) is subtracted from the luminance value of the pixel of which luminance value is the threshold value or more. It is therefore possible to suppress the increase of the luminance value caused by the increment in the vicinity of the pixel at the dark part having the luminance value of less than the threshold value.

[Process Flow of Dark Processing Part 201]

Figure 7:
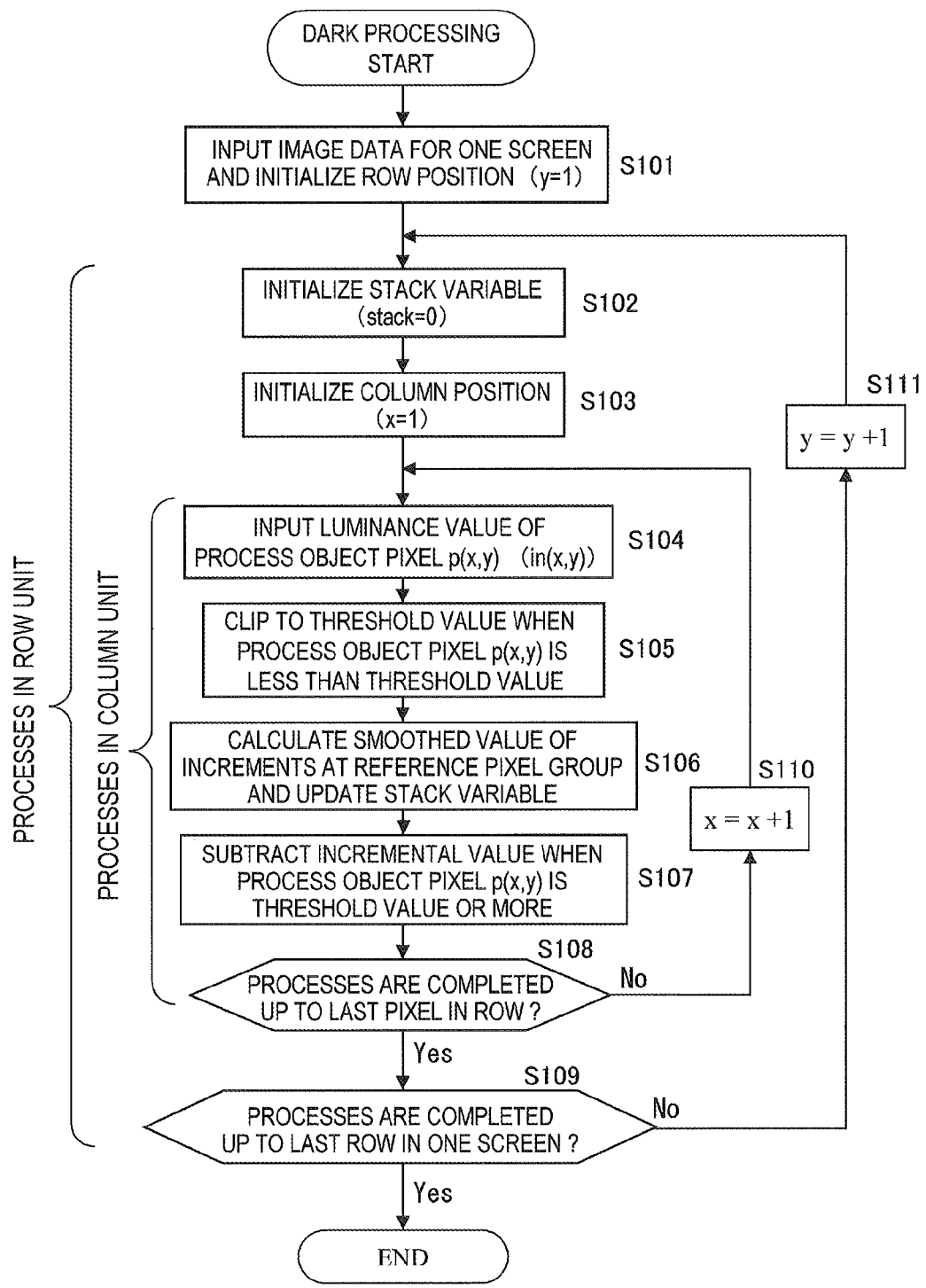
FIG. 7 is a flowchart of dark processing.

Next, a process flow performed by the dark processing part 201 for an image data for one screen is described by using a flowchart in FIG. 7. The processes when the pixel p (5, 3) in FIG. 5 is set to be the process object pixel are described in the above, but the actual dark processing part 201 performs the processes sequentially from a first row in a row unit for the image data photographed by the image sensor 104 having pixels two dimensionally disposed in x column and y row, and in each row, the similar processes are repeated sequentially from a pixel at a first column in a column unit. Here, processes from step S102 to step S109 correspond to processes performed in the row unit, and processes from step S104 to step S108 correspond to processes performed in the column unit, in FIG. 7.

(Step S101) An image data for one screen is acquired, and a variable (y) indicating a row position to be processed is initialized (y=1 (first row)). Note that when the reference pixel group is set to be each two pixels at above and below the process object pixel, objected reference pixel groups do not exist when a first row and a second row are processed and when processes of last two rows are performed, and therefore, an exceptional process is to be performed. In the exceptional process, for example, pixels at the OB area of the image sensor 104 are used, the pixels for two rows are selected from the OB area adjacent to the first row, and they may be set as reference pixels. Otherwise, when the first row is processed, the luminance values of two pixels at the below two rows (the second row and the third row) are doubly used, and the reference pixel group for four pixels at above and below may be made up.

(Step S102) The variable (stack variable: stack) to stack the smoothed incremental value of the increments in the reference pixel group is initialized (stack="0" (zero)).

(Step S103) A variable (x) indicating a first column position at the row selected at the step S102 is initialized (x=1 (first column)).

(Step S104) An image data of the process object pixel p (x, y) indicated by the current row position "y" and column position "x" is input. Here, the input luminance value corresponding to the pixel p (x, y) at the pixel coordinate illustrated in FIG. 5 is described as "in (x, y)". For example, the input luminance value of the process object pixel p (5, 3) of which row position is y=3, column position is x=5 is "in (5, 3)".

(Step S105) The input luminance value in (x, y) of the process object pixel p (x, y) is clipped to the threshold value when the input luminance value in (x, y) of the process object pixel p (x, y) is less than the threshold value set in advance. The luminance value after the clip is output as the output luminance value out (x, y) of the process object pixel p (x, y). This process corresponds to the process of the clip part 251.

(Step S106) The smoothed incremental value smoothing the incremental values of the reference pixel group centering on the process object pixel p (x, y) is calculated, and is added to the value held at the stack variable "stack". This process corresponds to the processes of the incremental calculation part 252 and the incremental holding part 253.

(Step S107) When the input luminance value in (x, y) of the process object pixel p (x, y) is the threshold value or more, the incremental value held at the incremental holding part 252 is subtracted from the luminance value. The luminance value after the subtraction is output as the output luminance value out (x, y) of the process object pixel p (x, y). This process corresponds to the process of the incremental subtraction part 254.

(Step S108) It is judged whether or not the processes from the step S104 to the step S107 are completed as for the pixels of all columns at the row selected by the row position variable (y). When the processes are all completed, the process proceeds to step S109, and when the processes are not completed, the process proceeds to step S110.

(Step S109) It is judged whether or not the processes from the step S102 to the step S108 are completed or not as for all of the rows in one screen. When the processes are all completed, the dark processing is finished, and when the processes are not completed, the dark processing proceeds to step S111.

(Step S110) The column position variable (x) is incremented by one to select a next column.

(Step S111) The row position variable (y) is incremented by one to select a next row.

As stated above, the dark processing part 201 stacks the increment generated by the clip processing to the stack variable "stack" when the input luminance value in (x, y) of the process object pixel p (x, y) is less than the threshold value. The increment stacked at the stack variable "stack" is subtracted from the luminance value of the pixel when the input luminance value in (x, y) of the process object pixel p (x, y) is the threshold value or more. Accordingly, the stack of the increment is reduced at the dark area, and the image data of which local average value is appropriately kept can be obtained. It is thereby possible to suppress the increase of the average luminance value at the dark area even when a subsequent noise reduction processing is performed, and both the superior noise reduction and the appropriate reproduction of the luminance value at the dark part can be both enabled.

[Program of Dark Processing]

Here, the processes performed in the flowchart in FIG. 7 can be described as follows when they are expressed by a programming language.

(Definition of Notation in Programming Language)

The input luminance value of the pixel p (x, y) before the dark processing: in (x, y)

The output luminance value of the pixel p (x, y) after the dark processing: out (x, y)

SH: threshold value

A=B: A value of "B" is substituted to a variable "A".

A−=B: Update a value of the variable "A" to (A−B)

A+=B: Update the value of the variable "A" to (A+B)

min (a, b, . . . ): Output a minimum value of a, b, . . .

max (a, b, . . . ): Output a maximum value of a, b, . . .

(Programming Example)

```
{(Process "a" in a row unit)
    stack = "0" (zero)
    {(Process "b" in a column unit)
        stack + = {max ((SH − in (x, y − 2), 0)
            + 2 × max ((SH − in (x, y − 1 ), 0)
            + 2 × max ((SH − in (x, y), 0)
            + 2 × max ((SH − in (x, y + 1 ), 0)
            + max ((SH − in (x, y + 2), 0)} / 8
        if (in (x, y) < SH) {
            out (x, y) = SH
        } else {
            offset = min (stack, (in (x, y) − SH))
            out (x, y) = in (x, y) − offset
            stack − = offset
        }
    } (Process "b")
} (Process "a")
```

As stated above, the processes of the dark processing part 201 can be executed as an image processing program of a personal computer. In this case, the whole of the processes of the image processing part 107 are executed by the image processing program, and for example, a storage medium such as a memory card in which already photographed image data are stored is attached to the personal computer instead of the image buffer 106, the processes of the dark processing part 201, the noise reduction processing part 202, the black-level clip processing part 203, and the other normal processes of the image processing part 204 and so on are executed, and the image data after the processes are stored to the memory card again, as described in FIG. 4.

(Application Example)

In the above-stated embodiment, it is described without conscious of the color image in particular. However, a Raw data (a row image data output from the image sensor 104) photographed through color filters in RGB three colors called as a Bayer array is used in an actual electronic camera. In this case, the processes described in the above-stated embodiment are applied to each of the color components in RGB, and thereby, the similar effect can be obtained. For example, demosaic processing (color interpolation processing interpolating and generating data in RGB by each pixel from the image data in the Bayer array) is performed after the dark processing is performed by each color component of the Raw data. The demosaic processing is therefore performed for the image data in which the noises at the dark part are reduced, and therefore, it is possible to improve accuracy of the image data after the demosaic processing compared to conventional demosaic processing in which the dark processing of the present embodiment is not performed.

FIG. 8A is a view illustrating an example of a pixel coordinate of the image sensor 104 in the Bayer array. In the image data photographed by the image sensor 104 in the Bayer array, R pixels, G pixels, and B pixels are regularly disposed, and therefore, for example, it is possible to obtain a pixel coordinate of only the R pixels if only the R pixels at odd number rows and odd number columns are extracted as illustrated in FIG. 8B. The pixel coordinate of only the R pixels is applied to the pixel coordinate in FIG. 5, and the dark processing is performed while setting five pixel groups made up of peripheral pixels p (5, 1), p (5, 3), p (5, 5), p (5, 7), p (5, 9) centering on the process object pixel p (5, 5) as the reference pixel group. Similarly, the dark processing can be performed as for the B pixels at even number rows and even number columns. Besides, in case of the G pixels, they are disposed in a staggered state, and therefore, for example, the dark processing may be performed while setting five pixel groups made up of peripheral pixels p (3, 2), p (5, 2), p (4, 3), p (3, 4), p (5, 4) centering on the process object pixel p (4, 3) as the reference pixel group in case of the G pixel of the process object pixel p (4, 3) in FIG. 8A. Otherwise, the dark processing may be performed while setting five pixel groups made up of peripheral pixels p (4, 1), p (5, 2), p (4, 3), p (3, 4), p (4, 5) centering on the process object pixel p (4, 3) as the reference pixel group. Besides, other peripheral pixels of the process object pixel p (4, 3) may be selected as the reference pixel group.

As stated above, it is possible to apply the dark processing similar to the above-stated embodiment for the image of the Raw data in the Bayer array and so on. Accordingly, it is possible to suppress the increase of the luminance values of the pixels at the dark part even when the subsequent noise reduction processing is performed, and it is possible to enable both the superior noise reduction and the appropriate reproduction of the luminance value at the dark part. Further, it is possible to improve the accuracy of the image data after the demosaic processing in case of the Raw data.

An image processing apparatus according to the embodiment includes: a clip part setting a threshold value as an output luminance value of a process object pixel when a luminance value of the process object pixel of an image data having luminance values of plural pixels is less than the threshold value set in advance; and an incremental processing part finding and holding an incremental value of the output luminance value relative to the luminance value of the process object pixel, and finding the output luminance value of the process object pixel by subtracting the incremental value from the luminance value when the luminance value of the process object pixel is the threshold value or more.

Besides, the incremental processing part may be made up of an incremental calculation part finding the incremental value of the output luminance value relative to the luminance value of the process object pixel; an incremental holding part holding the incremental value found by the incremental calculation part; and an incremental subtraction part subtracting the incremental value held at the incremental holding part from the luminance value and finding the output luminance value of the process object pixel when the luminance value of the process object pixel is the threshold value or more.

In particular, the incremental subtraction part may subtract the incremental value held at the incremental holding part from luminance values of pixels having the luminance values of the threshold value or more disposed at a periphery of the pixel having the luminance value of less than the threshold value, to find the output luminance value of the process object pixel.

Besides, the incremental subtraction part may set the threshold value as the output luminance value when the output luminance value after the subtraction is less than the threshold value. The incremental holding part may deducts a subtracted amount at the incremental subtraction part from the held incremental value when the luminance value of the process object pixel is the threshold value or more, to hold as a new incremental value.

Besides, the incremental calculation part may calculate incremental values of the process object pixel and a pixel adjacent to the process object pixel, find a smoothed incremental value in which the calculated incremental values of the respective pixels are weighted by a coefficient set in advance, and the incremental holding part may hold the smoothed incremental value found by the incremental calculation part.

In particular, the plural pixels of the image data are disposed in a matrix state, and the clip part, the incremental calculation part and the incremental subtraction part perform the respective processes in a row unit or in a column unit. In this case, the incremental holding part may reset the held value to zero every time when the processes in the row unit or the processes in the column unit are completed.

Further, a noise reduction part performing the noise reduction processing for the image data output from the image processing apparatus, and a black-level clip part setting the luminance value of the pixel at a black level when the luminance values of the respective pixels of the image data after the noise reduction processing are less than the black level set in advance may further be included.

Besides, the image data is an image data in a Raw format having pixels of RGB three colors, and the clip part, the incremental calculation part, the incremental holding part and the incremental subtraction part may perform the respective processes by each color of the image data in the Raw format.

In particular, the threshold value may be given by a next expression by using a negative coefficient set in advance and a standard deviation of a dark part noise at the light-shielding area of the image data.

Threshold value=(negative coefficient)×(standard deviation of dark part noise)

An electronic camera according to the present embodiment may provide: an image shooting part outputting an image data having luminance values in which object light incident via an optical system is photoelectric converted by plural pixels disposed two-dimensionally to the image processing apparatus; an operation member giving an imaging timing to the image shooting part; and a recording part recording the image data output from the image processing apparatus to a storage medium.

An image processing program according to the present embodiment is an image processing program executable on a computer, and the image processing program may include: clip processing setting a threshold value as an output luminance value of a process object pixel when a luminance value of the process object pixel of an image data having luminance values of plural pixels is less than the threshold value set in advance; incremental calculation processing finding an incremental value of the output luminance value relative to the luminance value of the process object pixel; incremental holding processing holding the incremental value found at the incremental calculation processing as a variable; and incremental subtraction processing subtracting the incremental value held as the variable from the luminance value when the luminance value of the process object pixel is the threshold value or more, to find an output luminance value of the process object pixel.

According to the above-stated embodiment, the increment by the clip is subtracted from the luminance values of the peripheral pixels, and therefore, it is possible to perform the noise reduction processing for the image in which the average value of the luminance values are appropriately kept without incurring the local increase of the luminance value at the dark part, and both the superior noise reduction and the appropriate reproduction of the luminance value at the dark part can be enabled.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image processing apparatus comprising:
a clip part setting a threshold value as an output value of a process object pixel when a luminance value of the process object pixel of an image having a plurality of pixels is less than the threshold value set in advance;
an incremental calculation part finding an incremental value of the output value of the process object pixel relative to the luminance value of the process object pixel; an incremental holding part holding the incremental value found by the incremental calculation part; and
an incremental subtraction part subtracting the incremental value held at the incremental holding part from the luminance value of the process object pixel to find the output value of the process object pixel when the luminance value of the process object pixel is the threshold value or more.

2. The image processing apparatus according to claim 1, wherein
the incremental subtraction part subtracts the incremental value held at the incremental holding part from luminance values of pixels having the luminance values of the threshold value or more disposed at a periphery of a pixel having the luminance value of less than the threshold value to find the output value of the process object pixel.

3. An electronic camera, comprising:
the image processing apparatus according to claim 2;
an image shooting part outputting an image data to the image processing apparatus, the image data having luminance values in which object light incident via an optical system is photoelectric converted by a plurality of pixels disposed two-dimensionally;
an operation member giving an imaging timing to the image shooting part; and
a recording part recording the image data output by the image processing apparatus to a storage medium.

4. The image processing apparatus according to claim 1, wherein
the incremental subtraction part sets the threshold value as the output value when the output value after the subtraction is less than the threshold value, and
the incremental holding part deducts a subtracted amount at the incremental subtraction part from the held incremental value to hold as a new incremental value when the luminance value of the process object pixel is the threshold value or more.

5. An electronic camera, comprising:
the image processing apparatus according to claim 4;
an image shooting part outputting an image data to the image processing apparatus, the image data having luminance values in which object light incident via an optical system is photoelectric converted by a plurality of pixels disposed two-dimensionally;
an operation member giving an imaging timing to the image shooting part; and
a recording part recording the image data output by the image processing apparatus to a storage medium.

6. The image processing apparatus according to claim 1, wherein
the incremental calculation part calculates incremental values of the process object pixel and a pixel adjacent to the process object pixel, and finds a smoothed incremental value in which the calculated incremental values of the respective pixels are weighted by a coefficient set in advance, and
the incremental holding part holds the smoothed incremental value found by the incremental calculation part.

7. An electronic camera, comprising:
the image processing apparatus according to claim 6;
an image shooting part outputting an image data to the image processing apparatus, the image data having luminance values in which object light incident via an optical system is photoelectric converted by a plurality of pixels disposed two-dimensionally;
an operation member giving an imaging timing to the image shooting part; and
a recording part recording the image data output by the image processing apparatus to a storage medium.

8. The image processing apparatus according to claim 1, wherein the pixels of the image are disposed in a matrix state, and the clip part, the incremental calculation part, and the incremental subtraction part perform the respective processes in a row unit or a column unit, the incremental holding part resets a held value to zero every time when the process in the row unit or the process in the column unit is completed.

9. An electronic camera, comprising:
the image processing apparatus according to claim 8;
an image shooting part outputting an image data to the image processing apparatus, the image data having luminance values in which object light incident via an optical system is photoelectric converted by a plurality of pixels disposed two-dimensionally;
an operation member giving an imaging timing to the image shooting part; and
a recording part recording the image data output by the image processing apparatus to a storage medium.

10. The image processing apparatus according to claim 1, further comprising: a noise reduction part performing noise reduction processing for an image data output by the image processing apparatus; and a black-level clip part setting the luminance value of each pixel as a black level when the luminance value of the pixel of the image data after the noise reduction processing is less than the black level set in advance.

11. An electronic camera, comprising:
the image processing apparatus according to claim 10;
an image shooting part outputting an image data to the image processing apparatus, the image data having luminance values in which object light incident via an optical system is photoelectric converted by a plurality of pixels disposed two-dimensionally;
an operation member giving an imaging timing to the image shooting part; and
a recording part recording the image data output by the image processing apparatus to a storage medium.

12. The image processing apparatus according to claim 1, wherein
the image is an image in a Raw format having pixels in RGB three colors, and
the clip part, the incremental calculation part, the incremental holding part, and the incremental subtraction part perform the respective processes by each color of the image in the Raw format.

13. An electronic camera, comprising:
the image processing apparatus according to claim 12;
an image shooting part outputting an image data to the image processing apparatus, the image data having luminance values in which object light incident via an optical system is photoelectric converted by a plurality of pixels disposed two-dimensionally;
an operation member giving an imaging timing to the image shooting part; and
a recording part recording the image data output by the image processing apparatus to a storage medium.

14. A non-transitory computer-readable medium having computer-executable instructions comprising: setting a threshold value as an output value of a process object pixel when a luminance value of the process object pixel of an image having a plurality of pixels is less than the threshold value set in advance;
finding an incremental value of the output value of the process object pixel relative to the luminance value of the process object pixel; holding the found incremental value as a variable; and finding the output value of the process object pixel by subtracting the incremental value held as the variable from the luminance value of the process object pixel when the luminance value of the process object pixel is the threshold value or more.

15. An electronic camera, comprising:
the image processing apparatus according to claim 14;
an image shooting part outputting an image data to the image processing apparatus, the image data having luminance values in which object light incident via an optical system is photoelectric converted by a plurality of pixels disposed two-dimensionally;
an operation member giving an imaging timing to the image shooting part; and
a recording part recording the image data output by the image processing apparatus to a storage medium.

16. An electronic camera, comprising:
the image processing apparatus according to claim 1;
an image shooting part outputting an image data to the image processing apparatus, the image data having luminance values in which object light incident via an optical system is photoelectric converted by a plurality of pixels disposed two-dimensionally;
an operation member giving an imaging timing to the image shooting part; and
a recording part recording the image data output by the image processing apparatus to a storage medium.

17. A non-transitory computer-readable medium having computer-executable instructions comprising:
setting a threshold value as an output value of a process object pixel when a luminance value of the process object pixel of an image having a plurality of pixels is less than the threshold value set in advance;
finding an incremental value of the output luminance value relative to the luminance value of the process object pixel;
holding the found incremental value as a variable; and
finding the output value of the process object pixel by subtracting the incremental value held as the variable from the luminance value when the luminance value of the process object pixel is the threshold value or more.

* * * * *